United States Patent [19]

Kikuchi

[11] Patent Number: 5,625,560
[45] Date of Patent: Apr. 29, 1997

[54] PRODUCTION CONTROL INFORMATION PROCESSING DEVICE

[75] Inventor: Ichiro Kikuchi, Tokyo, Japan

[73] Assignee: NEC Corporation, Tokyo, Japan

[21] Appl. No.: 361,216

[22] Filed: Dec. 21, 1994

[30] Foreign Application Priority Data

Dec. 24, 1993 [JP] Japan .................................. 5-327059

[51] Int. Cl.⁶ .................................................. G06F 19/00
[52] U.S. Cl. ........................... 364/468.09; 364/468.16; 364/552; 395/906
[58] Field of Search .................... 364/468, 152, 364/552, 401, 402, 403, 551.01, 550, 468.09, 468.16; 395/903, 904, 906, 912, 919, 925, 926

[56] References Cited

U.S. PATENT DOCUMENTS

| | | | |
|---|---|---|---|
| 4,796,194 | 1/1989 | Atherton | 364/468 |
| 5,161,111 | 11/1992 | Oehler et al. | 364/470 |
| 5,196,997 | 3/1993 | Kurtzberg et al. | 364/468 X |
| 5,284,164 | 2/1994 | Andrews et al. | 364/552 X |
| 5,369,570 | 11/1994 | Parad | 364/468 X |

FOREIGN PATENT DOCUMENTS 63-280411  11/1988  Japan .

OTHER PUBLICATIONS

WPI Abstract Accession No. 89-003204/01 and JP 63-280411, Derwent Info Ltd., 1995.

*Primary Examiner*—Joseph Ruggiero
*Attorney, Agent, or Firm*—Foley & Lardner

[57] ABSTRACT

A process rule storage unit stores a row of processes before and after each process in a process flow storage unit, a row of processes which must not exist before and after the process and a row of processes which are allowed to exist before and after process but require an operator's judgment. The process rule detection unit retrieves the process rule storage unit, and compares each process code in a row of processes with the process codes in the process flow storage unit to detect whether both condition codes agree with each other.

5 Claims, 6 Drawing Sheets

FIG. 3

21 FIRST PROCESS FLOW STORAGE UNIT

| PROCESS CODE | CONDITION CODE |
|---|---|
| 001 | ABC111 |
| C01 | ABC110 |

22 CONDITION RULE STORAGE UNIT

| RULE NO. | CONDITION CODE | RULE ROW | RULE FLAG |
|---|---|---|---|
| 1 | ABC111 | ABC111<br>AAA110 | P |
| 2 | ABC111 | DDD111<br>ABC111<br>A00111 | J |

23 FACILITY RULE STORAGE UNIT

| CONDITION CODE | RULE MACHINE GROUP | RULE FLAG |
|---|---|---|
| ABC111 | AB001<br>AB002<br>AC101 | P<br>J<br>R |
| AAA110 | CB001<br>CB002<br>CC003 | P<br>J<br>J |

FACILITY RULE DETECTION UNIT 24

25

| PROCESS CODE | CONDITION CODE | RULE NO. | FLAG | MACHINE GROUP | FLAG |
|---|---|---|---|---|---|
| 001 | ABC111 | 1 | | | |
| 001 | ABC111 | 2 | | | |
| 001 | ABC111 | | | AB001<br>AB002<br>AC101 | P<br>J<br>R |

PRODUCTION CONTROL INFORMATION PROCESSING DEVICE

BACKGROUND OF THE INVENTION

1. Field of the Invention

The present invention relates to a production control system, and more particularly to an information processing device for use in a production control system device capable of prohibiting the erroneous setting of manufacturing processes and conditions.

2. Description of the Prior Art

In a conventional information processing device of this kind, by means of information regarding a requisite process to be present and a prohibited process not to be present immediately before or after a specific process, with each process of a plurality of processes for one lot in the order of processing from the top process, it is determined whether the requisite process is absent, and whether the prohibited process is present, and if any, information with regard to absence of the requisite process and presence of the prohibited process are outputted. (refer to Japanese Patent Laid-Open No. 280411/88)

The conventional information processing device mentioned above has the following disadvantages:

(1) Only absence of the requisite process and presence of the prohibited process adjacent to each process for one lot arranged in the order of processing can be detected.

(2) The above detection is performed with respect to the combination of processes, and the correctness of the combination of working conditions, matching among the quality standards in process and presence or absence of machines placed in operating condition can not be detected.

(3) Such a case which requires an operator's judgment can not be detected. In other words, only absence or presence of predetermined combinations of processes can be detected, and the detection of absence or presence of other combinations of processes is possible only by an operator's elaborate checking of the process flow.

SUMMARY OF THE INVENTION

It is an object of the present invention to provide a production control information processing device which enables an operator to determine, the presence of a prohibited process, the absence of a requisite process and the presence of a process which requires an operator's judgment, adjacent to each process of a plurality of processes for a lot arranged in the processing order.

It is another object of the present invention to provide a production control information processing device which have information on a machine group capable of operating with a specific condition code, a machine group incapable of operating with a specific condition code, and a machine group which requires an operator's judgment, thereby enabling an operator to determine whether facilities are insufficient for production.

It is still another object of the present invention to provide a production control information processing device which is capable of detecting the mismatching of quality standards among processes.

According to one aspect of the present invention, there is provided a production control information processing device comprising first process flow storage means for storing process codes and condition codes of a plurality of processes for a lot in the processing order; process rule storage means for storing at least one type of three types of process rules, i.e., a first process rule representative of a row of processes which must exist before and behind each process stored in said first process flow storage means, a second process rule representative of a row of processes which must not exist before and behind said process, and a third process rule representative of a row of processes which are allowed to exist before and behind said process but require an operator's judgment; and process rule detection means for retrieving the process rule storage means, comparing each process code in a row of (1+N+M) processes (where N and M show the number of process existing before and after J th (J=1, 2, ...) process stored in the first process flow storage means, respectively) from the top process ocde with (J–N), (J–N+1), (J–N+2), ..., (J–1), J, (J+1), ..., (J+M–2), (J+M–1), (J+M) th process code in the first process flow storage means to detect whether both process codes agree each other.

According to another aspect of the present invention, there is provided a production control information processing device comprising first process flow storage means for storing process codes and condition codes of a plurality of processes for one lot in the processing order; condition rule storage means for storing at least one of three types of condition rules, i.e., a first condition rule representative of a row of conditions which must exist before and after each condition code stored in the first storage means, a second condition code representative of a row of condition rule which must not exist before and after said process, and a third condition rule representative of a row of conditions codes which are allowed to exist before and after said process thereof but require an operator's judgment; facility rule storage means for storing at least one of three types of machine groups, i.e., a first type of machine group which is allowed to operate with the condition code stored in the first storage means, a second type of machine group, which is not allowed to operate with the condition code and a third type of machine group which requires an operator's judgment; facility rule detection means for retrieving the condition rule storage means, comparing each condition code in a row of (1+N+M) condition codes (where N and M show the number of process existing before and after J th (J=1, 2, ...) process stored in the first process flow storage means, respectively) in the condition code of J th process from the top condition code with (J–N), (J–N+1), (J–N+2), ..., (J–1), J, (J+1), ..., (J+M–2), (J+M–1), (J+M) th condition code in the first process flow storage means to detect whether both condition codes agree each other.

According to still another object of the present invention, there is provided a production control information processing device comprising a first process flow storage means for storing process codes and condition codes of a plurality of processes for one lot in the procesing order; quality rule storage means for storing quality standards for each condition code stored in the first process flow storage means; second process flow storage means; quality rule detection means for retrieving the quality rule storage means, quality rule detection means for retrieving said quality rule storage means, comparing a quality standard or quality standards for the condition code of J (J=1, 2, ...) th process in said first process flow storage means with a quality standard/quality standards for the condition code of (J–1)th process respectively, and storing said process code, said condition code, said quality standard/standards and an alarm code in said second process flow storage means when at least one of the compared results shows disagreement.

In the first production control information processing device, presence of a prohibited process, absence of a requisite process and presence of a process requiring an operator's judgment, adjacent to each process in the first process flow storage means, can be detected. In addition, since the results of detection are stored in the second process flow storage means, an operator can easily examine the results of detection. In particular, the effectiveness of this device can be remarkably improved by utilizing the process requiring an operator's judgment that assumes an intermediate condition between the requisite condition (REQUISITE) and the prohibited condition (PROHIBIT).

In the second production control information processing device, presence of a prohibited condition, absence of a requisite condition and presence of a condition requiring an operator's judgment, adjacent to each process stored in the first process flow storage means, can be detected. In addition, since the results of detection are stored in the second process flow storage means, an operator can easily examine the results of detection. In particular, the effectiveness of this device can be remarkably improved by utilizing the process requiring an operator's judgment that assumes an intermediate condition between REQUISITE and PROHIBIT. In addition, since information on a machine group which is prohibited from operating and a machine group requiring an operator's judgment are also stored in the second process flow storage means, an operator can determine whether facilities are insufficient for production.

In the third production control information processing device, the efficiency of checking the process flow by an operator is greatly improved by employing the quality rule storage means and presenting the mismatching state of the quality standards among processes to an operator in the form of an alarm.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a block diagram of a production control information processing device in accordance with a second embodiment of the present invention;

DESCRIPTION OF THE PREFERRED EMBODIMENT

Figure 1:
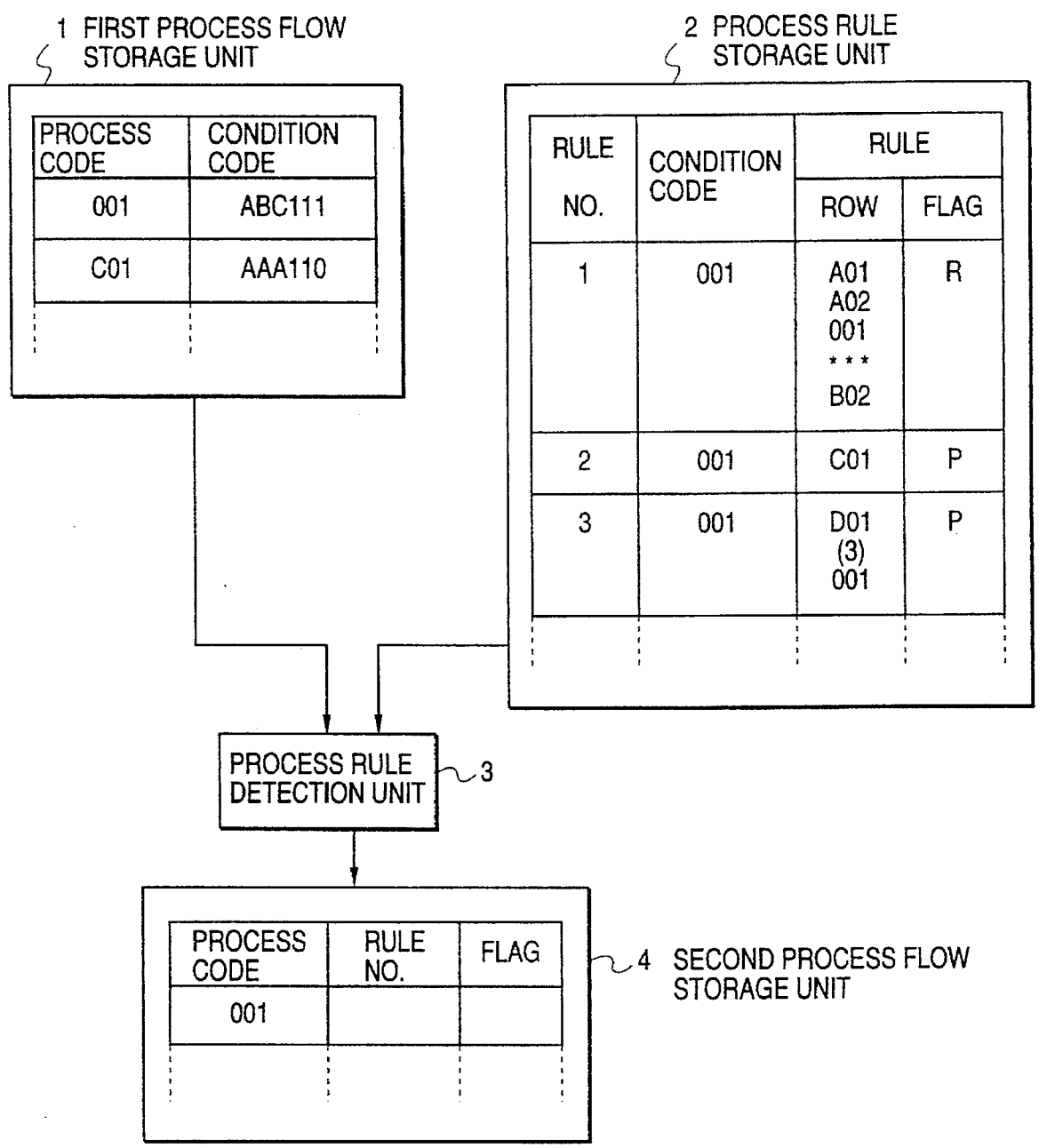
FIG. 1 is a block diagram of a production contol information processing device in accordance with a first embodiment of the present invention.

Referring now to FIG. 1, the first production control information processing device of the present invention comprises a first process flow storage unit 1, a process rule storage unit 2, a process rule detection unit 3 and a second process flow storage unit 4.

The first process flow storage unit 1 stores process codes and condition codes of a plurality of processes for one lot in the processing order. The process rule storage unit 2 stores at least one of three types of process rules, i.e., a first process rule representative of a row of processes which must exist before and after each process stored in the first process flow storage unit 1, a second process rule representative of a row of processes which must not exist before and after the process, and a third process rule representative of a row of processes which are allowed to exist before and after the process but require an operator's judgment.

The process rule detection unit 3 retrieves the process rule storage unit 2, compares each process code in a row of (1+N+M) processes (where N and M show the number of processes existing before and after Jth process stored in the first process flow storage unit 1, respectively) in the process rule for Jth process from the top process code with (J−N), (J−N+1), (J−N+2), . . . , (J−1), J, (J+1), . . . , (J+M−2), (J+M−1), (J+M) th process code stored in the first process flow storage unit 1 respectively to detect whether both process codes agree with each other, and stores in the second process flow storage unit 4, a flag representative of the type of the process rule, the processes code of the process and a rule No. when all the detected results show agreement and the flag represents the second process rule, when all the detected results show agreement and the flag represents the third process rule, and when at least one of the detected results show disagreement and the flag represents the first process rule.

The process rules stored in the process rule storage unit 2 may be expressed in various ways. A row "* * *" in the rule may be used to show agreement for any process. A row "5 * *" in the rule may be used to show agreement, if the process code begins with the number 5. A row "C 0 1" in the rule may be used to show agreement, if it is only one row and exists immediately before or after the process code "0 0 1". A row "(3)" in the rule may be used to show agreement, if at least three process codes exist between the process codes "0 0 1" and "D 0 1". The flag "R" in the rule represents a row of processes which must exist before and after the process in question. The flag "P" represents a row of processes which must not exist before and after the process in question. The flag "J" represents for a row of processes allowed to exist before and after the process in question but require an operator's judgment.

Figure 2:
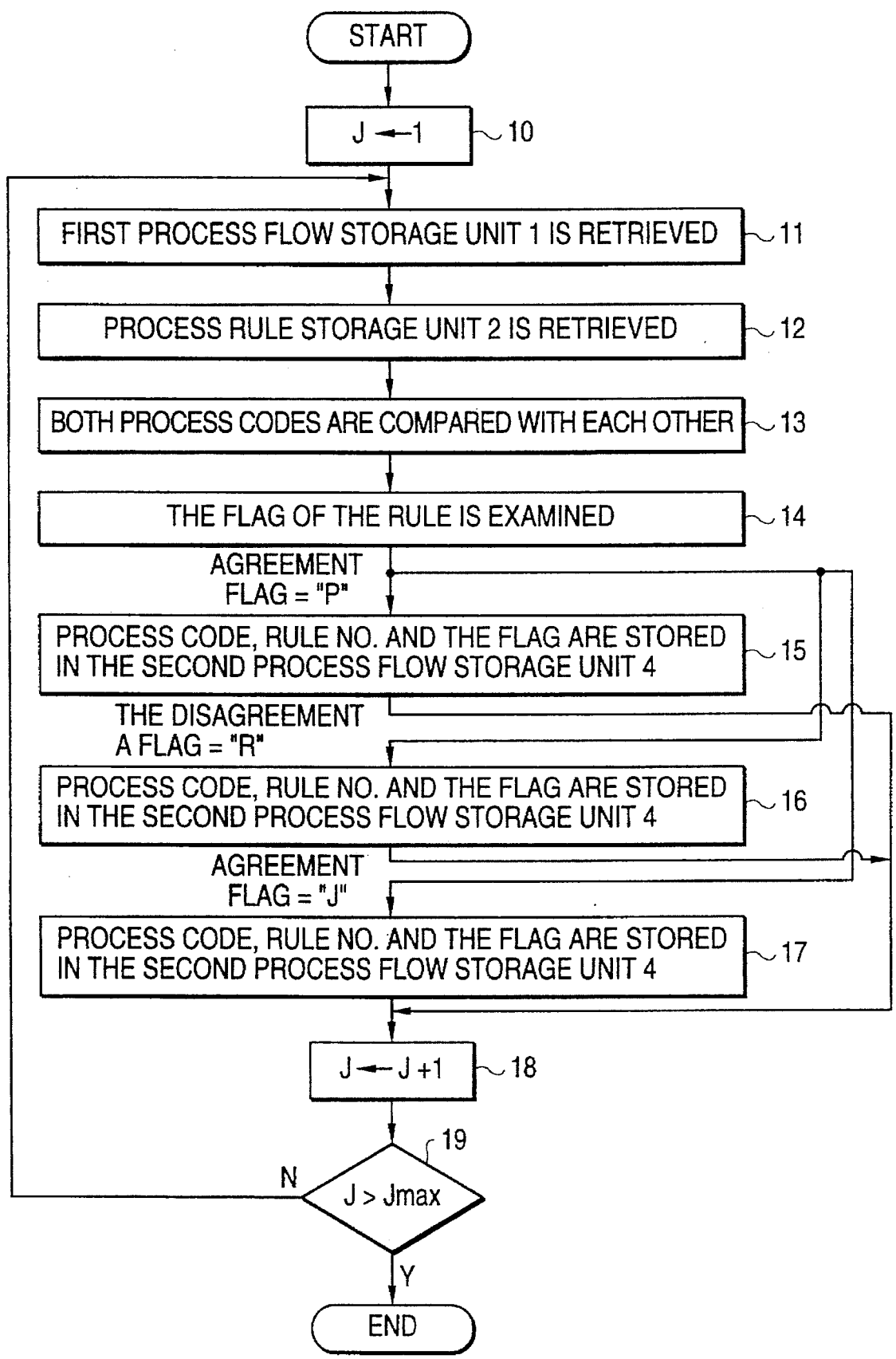
FIG. 2 is a flow chart illustrating the flow of processes in a process rule detection unit.

The operation of this embodiment will be explained below with reference to the flow chart of FIG. 2 which shows the flow of the procedure of the process rule detection unit 3.

First, in a step 10, the pointer J representing a process code and a condition code in the first process flow storage unit 1, is initialized. In a step 11, the process flow storage unit 1 is retrieved to obtain J th process code. In the step 12, the process rule storage unit 2 is retrieved to obtain the same process code as the J th process code. In a step 13, each process code in a row of (1+N+M) processes (where N, M show the member of the process existing before and after J th process, respectively) in the process rule for J th process from the top process with (J−N), (J−N+1), . . . , (J−1), J, (J+1), . . . , (J+M−2), (J+M−1), (J+M) th process code in the process flow storage unit 1 to detect whether both process codes agree with each other. If all the detected results show agreement, it will be judged as agreement, and if at least one of the detected results show disagreement, it will be judged as disagreement. Next, in the step 14, the flag in the rule corresponding to J th process code is examined. If the judgment shows agreement and the flag represents "P", the above process code, the rule No. and the flag "P" are stored in the second process flow storage unit 4 in a step 15. If the judgment shows disagreement and the flag represents "R", the process code, the rule No. and the flag "R" are stored in the second process flow memory block 4 in a step 16. If the judgment shows agreement and the flag represents "J", the process code, the rule No. and the flag "J" are stored in the second process flow storage unit 4 in a step 17. Next, in a step 18, the pointer J is updated. Finally, in a step 19, J is compared with J max to determine whether the steps 11~17 have been finished for all the process codes stored in the first process flow storage unit 1.

In the example of FIG. 1, since the row of rule No. 1 for the process code 001 is shown as "A 0 1", "A 0 2", "0 0 1", "* * *" and "B 0 2", the process rule detection unit 3 compares them with five process codes in the first process flow storage unit 1, respectively to detect whether both process codes agree with each other.

In this embodiment, as stated above, the presence of a prohibited process, absence of a requisite process and presence of a process which requires an operator's judgment can be detected with respect to the entire pattern registered in advance in the process rule storage unit 2. In addition, since the results of the detection are stored in the second process flow storage unit 4, an operator can easily examine the results of detection. In particular, the effectiveness of this device can be remarkably improved by utilizing the process requiring an operator's judgment which assumes an intermediate condition between REQUISITE and PROHIBIT.

Referring now to FIG. 3, the second production information processing device of this invention comprises a first process flow storage unit 21, a condition rule storage unit 22, a facility rule storage unit 23, a facility rule detection unit 24, and a second process flow storage unit 25.

The first process flow storage unit 21 stores process codes and condition codes of a plurality of processes for one lot in the process.

The condition rule storage unit 22 stores rule No., each condition code stored in the first process flow storage unit 21, and a rule ocnsisting of a row of condition codes and a flag. The flag "R" represents a row of condition codes which must exist before and after the condition code. The flag "P" represents a row of condition codes which must not exist before and after the condition code. The flag "J" is representative of a row of conditions which are allowed to exist before and after the condition code but requries an operator's judgment.

The facility rule storage unit 23 stores each condition code stored in the first process flow storage unit 21, and a rule constituting a machine group and a flag. The flag "R" represents a machine group which is capable of operating with the condition code. The flag "P" represents a machine group which is incapable of operating with the condition code. The flag "J" represents a machine group which requires an operator's judgment to cause it to operate with the condition code.

The facility rule detection unit 24 retrieves the condition rule storage unit 22, compares each condition code in a row of (1+N+M) condition codes [where N and M show the number of process existing before and after J th (J=1, 2, . . . ) process stored in the first process flow storage unit 21, respectively] in the condition code of J th process from the top condition code with (J–N), (J–N+1), (J–N+2), . . . . (J–1), J, (J+1) . . . , (J+M–2), (J+M–1), (J+M) th condition code in the first process flow storage unit 21 to detect whether both condition codes agree with each other, and stores in the second process flow storage unit 25 the process code, the condition code, the rule No. and the flag when all the detected results show agreement and the flag represents "P", when all the detected results show agreement and the flag represents "J", and when at least one of the detected results show disagreement and the flag represents "R".

Thereafter, the facility rule detection unit 24 retrieves the facility rule storage unit 23, and stores in the second process flow storage unit 25 machine groups having the flag "P" or "J" with the process codes and the flag.

Figure 4:
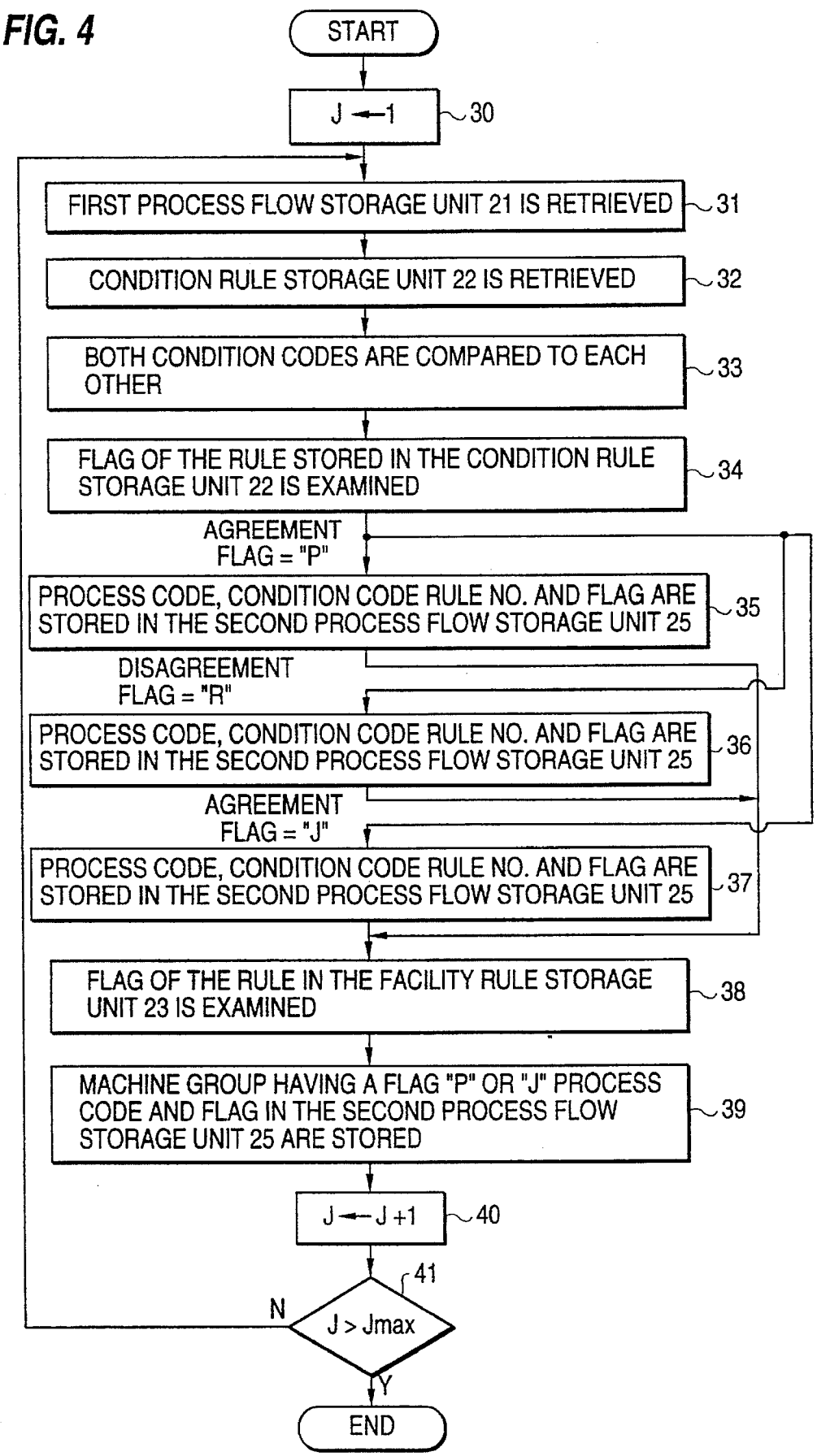
FIG. 4 is a flow chart illustrating the flow of processes in a facility rule detection block.

The operation of this embodiment will be explained with reference to the flow chart of FIG. 4 illustrating the procedure of the facility rule detection unit 24.

First, in a step 30, the pointer J indicating a process code and condition code in the first process flow storage unit 21 is initiated. In a step 31, the first process flow storage unit 21 is retrieved to obtain the condition code corresponding to J th process code. Next, in a step 32, the condition rule storage unit 22 is retrieved to obtain the rule for the same condition code as the J th condition code. In a step 33, each condition code in the row of the rule corresponding to the above condition code is compared with the condition codes in the first process flow storage unit 21 to detect whether both condition codes agree with each other. If all the detected results show agreement, it will be judged as agreement, and if at least one of the detected results show disagreement, it will be judged as disagreement. In the example of FIG. 3, since the row of the rule of the No. 1 rule is shown as "A B C 111", "A A A 110", the facility rule detection unit 24 compares them with the first and second condition codes stored in the process flow storage unit 21, respectively to detect whether both condition codes agree with each other. Next, in a step 34, the flag of the rule in the condition rule storage unit 22 is examined. When the flag of the rule represents "P" and the judgment in the step 33 shows agreement, the process code and condition codes in the first process flow storage unit 21 as well as the rule No. and the flag "P" in the condition rule storage unit 22 are stored in the second process flow storage unit 25 in a step 35. When the flag of the rule represents "R" and the judgment in the step 33 shows disagreement, the process code and condition code in the first process flow storage unit 21 as well as the rule No. and the flag "R" in the condition rule storage unit 22 are stored in the second process flow stoage unit 25 in a step 36. When the flag of the rule represents "J" and the judgment in the step 33 shows agreement, the process code and condition codes in the first process flow storage unit 21, as well as the rule No. and the flag "J" in the condition rule storage unit 22 are stored in the second process flow storage unit 25 in a step 37. In the next step 38, the flag of the rule in the facility rule storage unit 23 is examined. In a step 39, machine groups having the flag "P" or "J" are stored in the second process flow storage unit 25 with the process code, the machine group and the flag in a step 39. The pointer J is updated in a step 40. Next, in a step 41, it is determined whether J is greater than J max, and if J is not greater than J max, step 31 through 39 will be repeated.

In this embodiment, as described above, the presence of a prohibited condition, absence of a requisite condition and presence of a condition requiring an operator's judgment can be detected with respect to the entire pattern registered in advance in the condition rule storage unit 22 and the results of detection are stored in the second process flow storage unit 25, so that an operator can easily examine the results of detection. In particular, the effectiveness of this device can be remarkably improved by utilizing the process requiring an operator's judgment that assumes an intermediate condition between REQUISITE and PROHIBIT. In addition, since information on a machine group which is prohibited from operating and a machine group requiring an operator's judgment are stored in the second process flow storage unit, an operator can determine whether facilities are insufficient for production.

Figure 5:
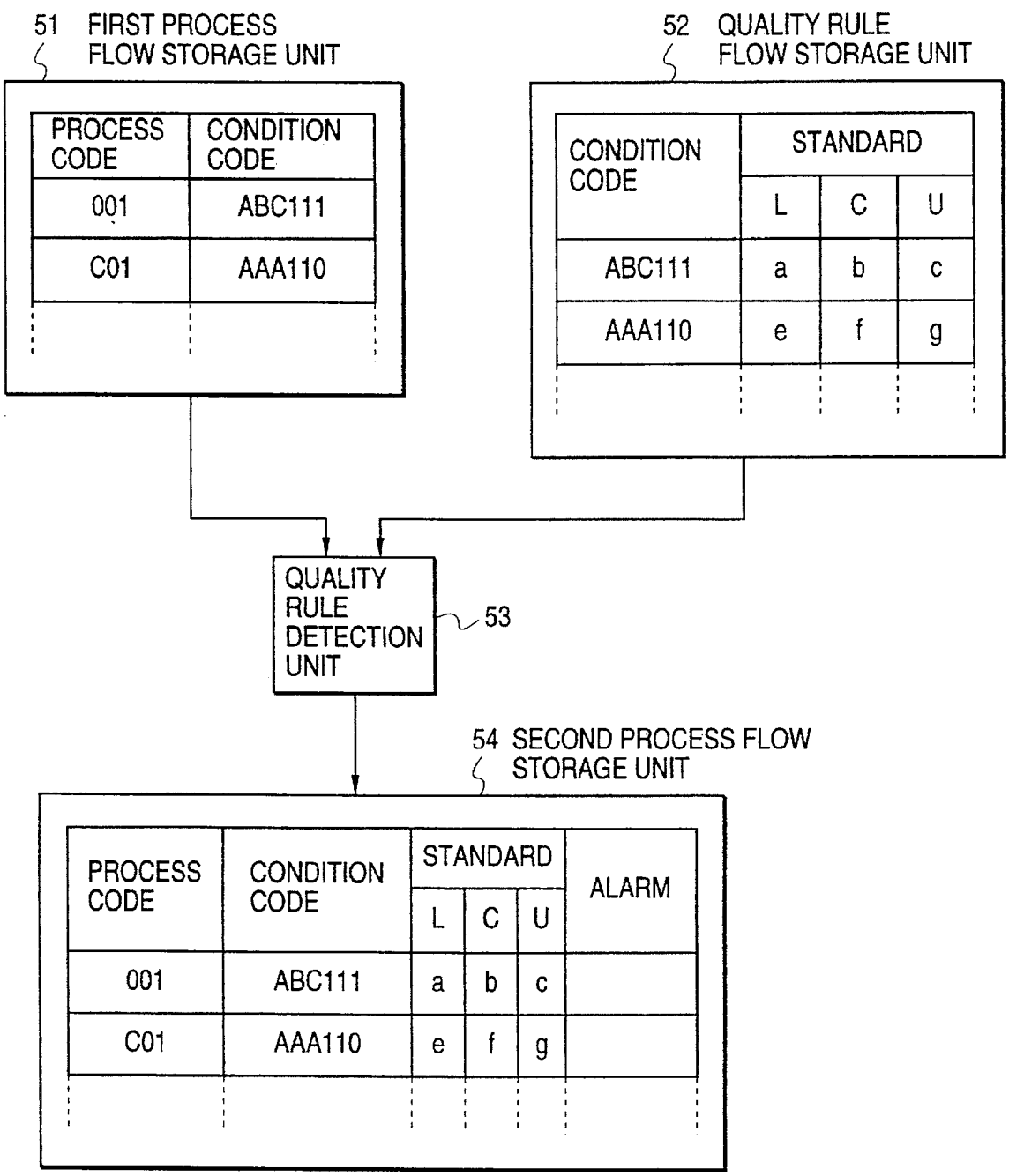
FIG. 5 is a block diagram of a production control information processing device in accordance with a third embodiment of the present invention.

Referring to FIG. 5, the third poduction control information processing device according to the present invention comprises a first process flow storage unit 51 for storing process codes and condition codes of a plurality of processes for one lot in the processing order, a quality rule storage unit 52 for storing quality standards for the condition code of each process code stored in the first process flow storage unit 51, a second process flow storage unit 54, and a quality rule detection unit 53 for retrieving the quality rule storage unit 52, comparing a quality standard/quality standards for the condition code of J (1=1,2,...) th process in the first process flow storage unit 51 with a quality standard/quality standards for the condition code of (J–1) th process, respectively and storing the process code, the condition code, the quality standard/quality standards and an alarm code in the second process flow storage unit 54 when at least one of the compared results show disagreement.

Figure 6:
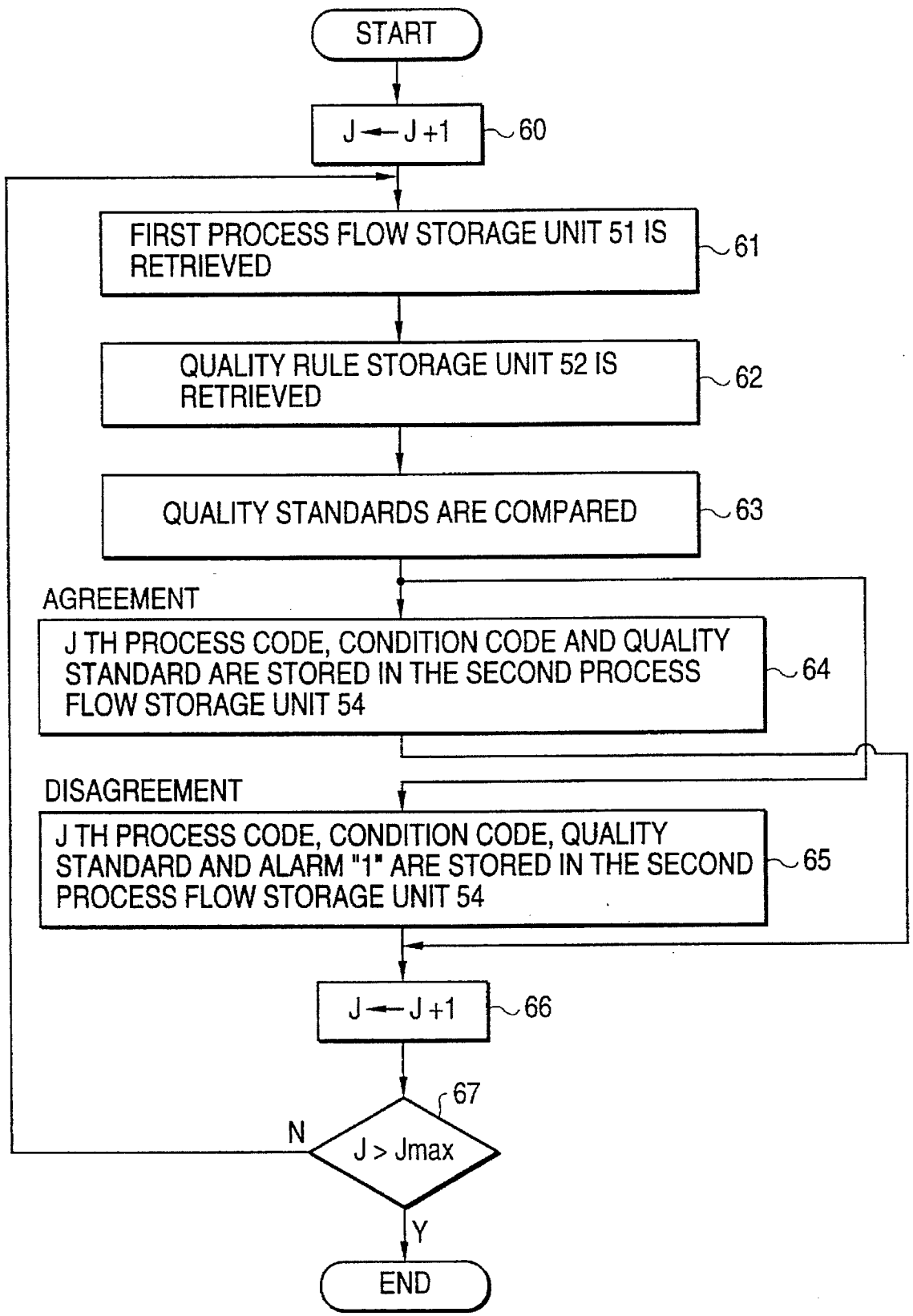
FIG. 6 is a flow chart illustrating the flow of processes in a quality rule detection block.

Next, the operation of this embodiment will be explained with referrence to the flow chart of FIG. 6 illustrating the procedure of the quality rule detection unit 53.

First, in a step 60, the pointer J indicating a process code and a condition code in the first process flow storage unit 51 is initialized. In a step 61, the first process flow storage unit 51 is retrieved to obtain the condition code corresponding to the J th process code. Next, in a step 62, the quality rule memory block 52 is retrieved to obtain the same condition code as the J th condition code. In a step 63, quality standards for J th process code are compared with quality standards for (J–1)th process code, respectively to detect whether both quality standards agree with each other. If all the quality standards agree each other, it is judged as agreement, and if at least one of the quality standards is different from others, it is judged as disagreement. When the judgment shows agreement, the J th process code, condition code and the quality standards are stored in the second process flow storage unit 54 in a step 64. When the judgment shows disagreement, the J th process code, the condition code, the quality standards, and the alarm '1' are stored in the second process flow storage unit 54 in a step 65. Next, in a step 66, the pointer J is updated. Finally, in a step 67, it is determined whether J is greater than Jmax, and if J is not greater than Jmax, then Steps 61 through 65 are repeated until J becomes greater than Jmax.

In this embodiment, the effectiveness of checking the process flow by an operator are greatly improved by presenting the mismatching state of the quality standards among processes to the operator in the form of an alarm.

Although certain preferred embodiments of the present invention have been shown and described in detail, it should be understood that various changes and modifications may be made therein without departing from the scope of the appended claims.

What is claimed is:

1. A production control information processing device, comprising:

first process flow storage means for storing process codes and condition codes of a plurality of processes for a lot in a processing order;

process rule storage means for storing at least one of three types of process rules, including a first process rule representative of a row of processes which must exist before and after each process stored in said first process flow storage means, a second process rule representative of a row of processes which must not exist before and after said process, and a third process rule representative of a row of processes which are allowed to exist before and after said process and require an operator's judgment; and process rule detection means for retrieving said process rules from said process rule storage means, comparing each process code in a row of (1+N+M) processes {where N and M show the number of the process existing before and after a J th (j=1, 2, . . .) process stored in said first process flow storage means, respectively} in the process rule for the J th process, with (J–N), (J–N+1), (J–N+2), . . . , (J–1), J, (J+1), . . . , (J+M–2), (J+M–1), (J+M) th process code in said first process flow storage means respectively to detect whether both process codes agree with each other.

2. The device according to claim 1, further comprising second process flow storage means, and wherein said process rule detection means includes means for storing in said second process flow storage means the process code of a process in question and information showing the type of the process rule in question when all the detected results show agreement and said process rule in question is the second process rule, when all the detected results show agreement and said process rule in question is the third process rule, and when at least one of the detected results show disagreement and said process rule is the first process rule.

3. A production control information processing device, comprising:

first process flow storage means for storing process codes and condition codes of a plurality of processes for a lot in a processing order;

condition rule storage means for storing at least one of three types of condition rules, including a first condition rule representative of a row of conditions which must exist before and after each condition code stored in said first process flow storage means, a second condition rule representative of a row of conditions which must not exist before and after said process, and a third condition rule representative of a row of conditions which are allowed to exist before and after said process and require an operator's judgment;

facility rule storage means for storing at least one of three kinds of machine groups, including a first type of machine group which is allowed to operate with each condition code stored in said first process flow storage means, a second type of machine group which is not allowed to operate with the condition code, and a third type of machine group which requires an operator's judgment to cause it to operate; and facility rule detection means for retrieving said condition rules from said condition rule storage means, comparing each condition code in a row of (1+N+M) condition codes {where N and M show the number of the process existing before and after J th (J=1, 2, . . .) process in said first process flow storage means, respectively} in the condition code of J th process from the top condition code, with (J–M), (J–N+1), (J–N+2), . . . , (J–1), J, (J+1), . . . , (J+M–2), (J+M–1), (J+M) th condition code in said first process flow storage means to detect whether both condition codes agree with each other.

4. The device according to claim 3, further comprising second process flow storage means, and wherein said facility rule detection means includes means for storing in said second process flow storage means a process code in question, a condition rule in question and information showing the type of the condition rule in question when the detected results show agreement and said condition code is the second condition rule, when the detected results show agreement and said condition code is the third condition rule, and when at least one of the detected results show disagreement and said condition code is the first condition rule, retrieving a facility rule from said facility rule storage means and storing in said second process flow storage means information on a machine group which is not allowed to operate with the condition code of said J th process and a machine group which requires an operator's judgment to cause it to operate, together with the process code of said process and information on the type of said machine group.

5. A production control information processing device, comprising:

first process flow storage means for storing process codes and condition codes of a plurality of processes for a lot in a processing order;

quality rule storage means for storing quality standards for each condition code stored in said process flow storage means;

second process flow storage means;

quality rule detection means for retrieving said quality standards from said quality rule storage means, comparing quality standards for the condition code of a J (J=1, 2, . . .) th process in said first process flow storage means, with quality standards for the condition code of a (J−1) th process respectively, and storing said process code, said condition code, said quality standards and an alarm code in said second process flow storage means when at least one of the compared results shows disagreement.

\* \* \* \* \*